(12) United States Patent
Kuroiwa

(10) Patent No.: US 9,261,756 B2
(45) Date of Patent: Feb. 16, 2016

(54) LOCK RELEASING DEVICE FOR CAMERA

(71) Applicant: COSINA CO., LTD., Nakano-shi, Nakano-ken (JP)

(72) Inventor: Yohei Kuroiwa, Nakano (JP)

(73) Assignee: COSINA CO., LTD., Nakano-shi (JP)

( * ) Notice: Subject to any disclaimer, the term of this patent is extended or adjusted under 35 U.S.C. 154(b) by 102 days.

(21) Appl. No.: 14/151,465

(22) Filed: Jan. 9, 2014

(65) Prior Publication Data
US 2015/0016814 A1 Jan. 15, 2015

(30) Foreign Application Priority Data

Jul. 11, 2013 (JP) ................................. 2013-145187

(51) Int. Cl.
*G03B 17/14* (2006.01)
*G02B 7/14* (2006.01)
*G03B 17/56* (2006.01)

(52) U.S. Cl.
CPC ........ *G03B 17/14* (2013.01); *G02B 7/14* (2013.01); *G03B 17/565* (2013.01)

(58) Field of Classification Search
CPC ............................... G03B 17/14; G03B 17/565
USPC ................................................. 396/529–530
See application file for complete search history.

(56) References Cited

U.S. PATENT DOCUMENTS

| 4,341,450 A * | 7/1982 | Shigoku ........................ 396/298 |
| 4,417,798 A * | 11/1983 | Ohkura et al. ................ 396/508 |
| 4,632,510 A * | 12/1986 | Miki et al. ..................... 359/827 |
| 4,781,448 A * | 11/1988 | Chatenever et al. .......... 359/701 |
| 5,416,549 A * | 5/1995 | Katsuyama et al. .......... 396/529 |
| 7,874,747 B2 * | 1/2011 | Ueda et al. ..................... 396/530 |
| 2011/0181970 A1 * | 7/2011 | Aiba ............................. 359/819 |

FOREIGN PATENT DOCUMENTS

| JP | 10-90773 A | 4/1998 |
| JP | 10-206953 A | 8/1998 |
| JP | 2000-305127 A | 11/2000 |
| JP | 2003-344926 A | 12/2003 |
| JP | 2011-175190 A | 9/2011 |

\* cited by examiner

*Primary Examiner* — Christopher Mahoney
(74) *Attorney, Agent, or Firm* — Birch, Stewart, Kolasch & Birch, LLP

(57) ABSTRACT

A lock releasing device a camera that is disposed on a camera body and can release by an external operation a lock of a lens locking mechanism that locks an interchangeable lens mounted on the camera body which includes a lock releasing part that can release the lock of the lens locking mechanism 2 imparting a predetermined displacement amount Sm, and a lock releasing ring that is disposed at a coaxial position to the interchangeable lens L in such a manner as to transmit the predetermined displacement amount Sm to the lock releasing part and enable the external operation.

11 Claims, 8 Drawing Sheets

LOCK RELEASING DEVICE FOR CAMERA

TECHNICAL FIELD

This invention relates to a lock releasing device for camera suitable for using in releasing a lock of a lens-locking mechanism that locks an interchangeable lens mounted on a camera body side.

BACKGROUND ART

Generally, a lens interchangeable camera is configured by a combination of a camera body and an interchangeable lens that is attached to and detached from this camera body. In this case, if the camera body and the interchangeable lens are of the same manufacturer, the interchangeable lens can be directly mounted on the camera body. However, in a case where the standard (manufacturer standard) of the mount part of the camera body is different from that of the mount part of the interchangeable lens due to the difference in the manufacturers of the camera body and the interchangeable lens, direct mounting is not possible. Thus, a mount adaptor is interposed between the camera body and the interchangeable lens to enable mounting. Moreover, the camera body side (including the mount adaptor) has a built-in lens locking mechanism, which locks the mounted interchangeable lens on the camera body side to inhibit falling of the interchangeable lens. On the other hand, a lock releasing device is disposed on the camera body side so that in removing the interchangeable lens from the camera body side, the interchangeable lens can be removed by manually operating the lock releasing device and releasing the lock of the lens locking mechanism.

Conventionally, this type of lock releasing device is mostly configured by a so-called one-point operation method using an operation button or an operation lever. For example, Patent Literature 1 discloses a releasing mechanism that releases a lock by pressing down an attachment/detachment button to cause a lock pin that interlocks with the attachment/detachment button to retract from a mount surface of a camera mount. Patent Literature 2 discloses a releasing mechanism that releases locks by pushing in a lock releasing button to cause a tip of a guide axis to press a pressed part and move a lock pin support member downward along the guide axis against an biasing force of a lock pin biasing spring, and further retreating a tip of a lens lock pin to a disengaged position that is roughly flush with a mount surface on the body side to accommodate it in a lock pin advancing/retreating hole. Patent Literature 3 discloses a releasing mechanism that releases a lock of a lens by pressing a head part of a lock releasing button to cause the lock releasing button and a movable member to move against a spring and cause a lens locking lever to rotate about the axis by a tapered outer peripheral surface of the movable member, and allowing a lock claw of the lens locking lever to come off from the lens that is mounted on a lens mount. Furthermore, Patent Literature 4 discloses a releasing mechanism that releases a lock of a lens by pressing down a mount lock releasing button against an elastic force of a compression coil spring to cause a tip part of an axis to push down a connecting member and allowing a pin to be guided to a cylindrical guide part to pull down a lock pin in its axial direction, thereby pulling down a lens driving pin that interlocks with the lock pin.

SUMMARY OF INVENTION

Technical Problem

However, the above-mentioned conventional lock releasing devices for camera (Patent Literatures 1-4) had the following problems.

First, an operation button or an operation lever considerably projects from the disposed surface of the camera body side. The projecting part is difficult to be held by a hand and thus becomes an obstructive existence in using a camera. Also, the projecting part makes it difficult to design a camera in a simple or smart design (shape) which is a minus factor from the point of securing freedom of design.

Second, since a so-called pinpoint-like operation needs to be performed, an operation has to be done by confirming the position of the button or lever, and depending on the entire shape of the camera body, there is a case in which an operation is difficult from the position of the hand holding the camera body. Thus, it cannot be necessarily said to be a desirable releasing means since being poor in operation properties due to the inability of performing easy and rapid operation and from the viewpoints of securing the easiness and rapidity of the releasing operation.

This invention aims to provide the lock releasing device for camera solving the problems existing in such background art.

Solution to Problem

This invention is a lock releasing device for camera that is disposed on a camera body side and can release a lock of a lens locking mechanism that locks an interchangeable lens mounted on the camera body side by an external operation, comprising a lock releasing part that can release the lock of the lens locking mechanism by imparting a predetermined displacement amount and a lock releasing ring that is disposed at a coaxial position to the interchangeable lens in such a manner as to transmit at least a predetermined displacement amount to the lock releasing part and enable external operation.

Advantageous Effects of Invention

According to a lock releasing device for camera 1 relating to this invention having such a configuration, the following remarkable effects are achieved.

(1) Since an entirely ring-shaped lock releasing ring 4 that is disposed at the coaxial position to an interchangeable lens L is provided, this lock releasing ring 4 can be integrated in shape (in design) with the interchangeable lens L. Thus, a useless projecting part at the front of the camera is eliminated so as to improve space-saving properties, handling properties, freedom of design, and further improve product marketability due to creating an entire sense of unity.

(2) Since there is provided the lock releasing ring 4 that can transmit at least a predetermined displacement amount Sm to a lock releasing part 3 and can be externally operated, the portion over at least a predetermined range in the lock releasing ring 4 that transmits the displacement amount Sm to the lock releasing part 3 becomes the operable range. Thereby, in a case of assuming a general interchangeable lens L, the circumferential range of approximately ±50[°] to the position of the lock releasing part 3 and the circumferential range of approximately 100[°] on the whole become the operable range. Thus, an easy and rapid releasing operation is made possible, so as to contribute to an improvement in operability.

(3) According to a preferred embodiment, if the lock releasing part 3 is disposed at the position on the right side (or left side) seen from the back direction Fr to the interchangeable lens L mounted on the camera body C side, an easy operation by the finger of a hand is allowed in holding the camera body C by the hand, so as to contribute to a further improvement in facility and rapidity of the releasing operation.

(4) According to a preferred embodiment, if the lock releasing part 3 is concurrently used as a lock part 2r in a lens locking mechanism 2, the configuration can be simplified so as to contribute to a reduction in costs due to a reduction in the number of components, an improvement in durability due to an improvement in rigidity, and an improvement in a sense of operation.

(5) According to a preferred embodiment, if the lock releasing part 3 is formed separately from the lock part 2r in the lens locking mechanism 2, the assembly of the lock releasing device 1 including the lock releasing part 3 is allowed without being influenced by the shape and configuration of the lock part 2r, so as to improve the freedom of design of a whole device and contribute to an improvement in multifunctional properties.

(6) According to a preferred embodiment, if the lock releasing ring 4 is disposed in such a manner that it can be displaced to advance and retreat in an optical axis direction Fc including a lock releasing direction Fcn in which the lock is released against elasticity of an elastic member 5s (5r-) biasing in the optical axis direction Fc, the lock releasing operation can be easily performed by a so-called one-push method.

(7) According to a preferred embodiment, if the lock releasing ring 4 is disposed in such a manner that it can be displaced to rotate in a circumferential direction Ff including lock releasing directions Ffn and Ffp in which the lock is released against elasticity of an elastic member 5s that bias in the circumferential direction Ff, the lock releasing operation can be performed similarly to the operation ring such as a focus ring and a zoom ring in the interchangeable lens L, so as to create a sense of unity to the interchangeable lens L from the operation side. Moreover, since operation can be performed at all the positions in the entire periphery (360[°]) in the circumferential direction Ff of the lock releasing ring 4, ease of use and convenience can be enhanced and it can be easily operated by a left-hand user.

(8) According to a preferred embodiment, if the lock releasing ring 4 is disposed in a mount adaptor A that is attached to and detached from a camera mount part Cm in a camera body C, greater performance can be obtained from the point of securing the effects of action of the present invention. That is, since the entire shape of the mount adaptor A is a ring shape, the operation lever had to be provided instead of the operation button in conventional cases. Thus, the projecting part is more prominent to be an obstructive existence as the entire shape, but these conventional problems can be solved by the adoption of the lock releasing ring 4.

(9) According to a preferred embodiment, if the mount adaptor A is provided with an auxiliary ring for focus adjustment 7 that can displace a front mount part 6 to which the interchangeable lens L is attached and detached in the optical axis direction Fc, the interchangeable lens L can be moved in addition to the focusing range (distance) of the original focusing ring that is provided in the interchangeable lens L, so as to further enhance the entire performance of the camera by further expanding the entire focusing range (distance).

(10) According to a preferred embodiment, if the mount adaptor A is provided with an auxiliary ring locking mechanism 8 that locks or releases the lock of the adjusted position of the auxiliary ring for focus adjustment 7, such inconvenience that the set position (adjusted position) that is adjusted by the auxiliary ring for focus adjustment 7 is shifted by mistake during use can be avoided. Thus, stability in use and ease of use can be further enhanced.

(11) According to a preferred embodiment, if the lock releasing ring 4 is disposed integrally with the camera body C, the useless projecting part at the front (front panel) of the camera body C can be eliminated, so as to contribute to an improvement in the design properties (shape properties) of the entire camera.

DESCRIPTION OF EMBODIMENTS

Next, preferred embodiments relating to this invention are explained in detail based on the drawings. In addition, attached drawings are not for specifying this invention, but for facilitating the understanding of this invention. Moreover, with respect to known parts, detailed description is omitted in order to avoid the obscuration of the invention.

First, to assist the understanding of the configuration of the lock releasing device 1 relating to this embodiment, the summary of the basic configuration of the mount adaptor A provided with the same lock releasing device 1 is explained by referring to FIG. 1 to FIG. 8.

Figure 7:
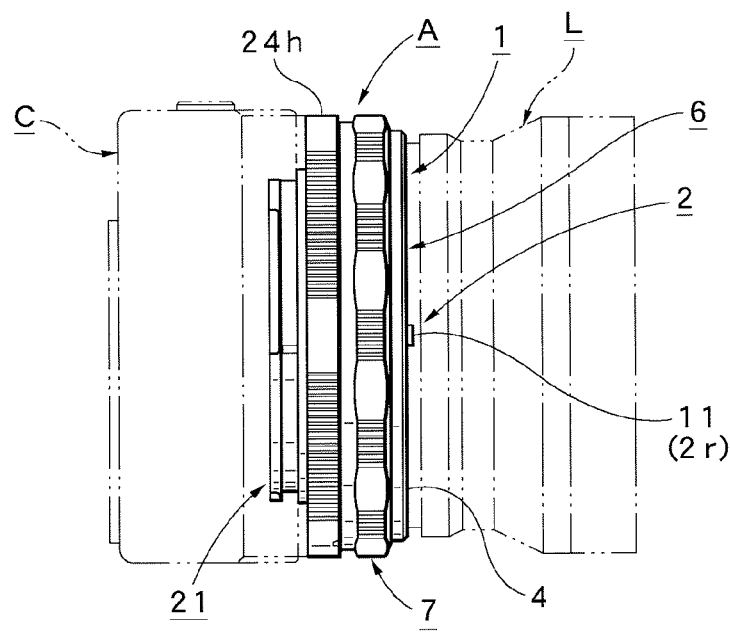
FIG. 7 is a side view of the same mount adaptor and a virtual view showing the state in which a camera body and the interchangeable lens are mounted on this mount adaptor.
Figure 8:
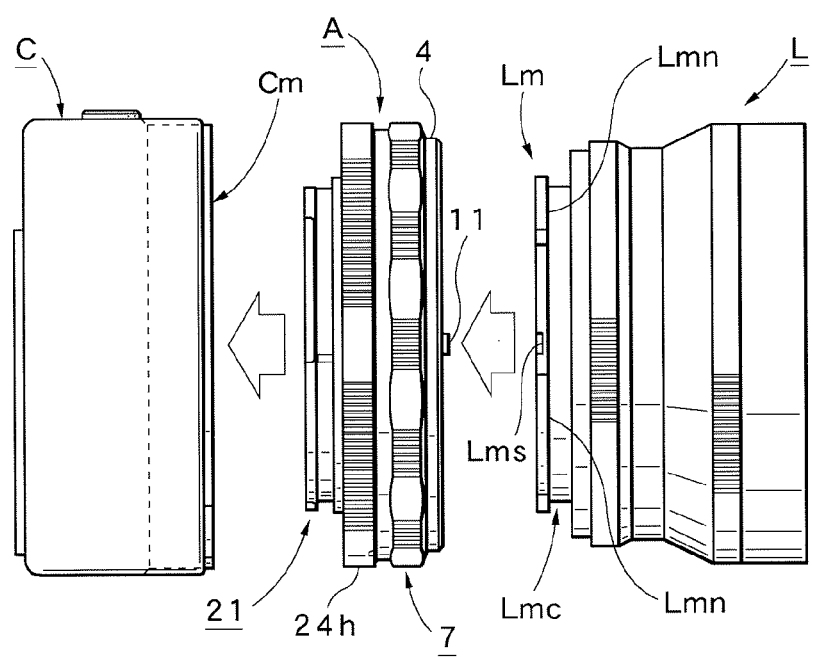
FIG. 8 is a side view of the same mount adaptor and a side view of the camera body and the interchangeable lens mounted on this mount adaptor.
Figure 9:
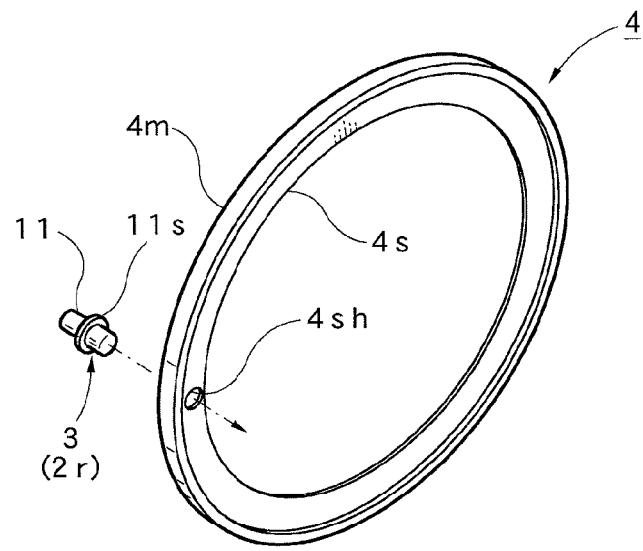
FIG. 9 is a perspective view of a lock releasing ring and a lock releasing part (lock pin) provided in the same lock releasing device.
Figure 10:
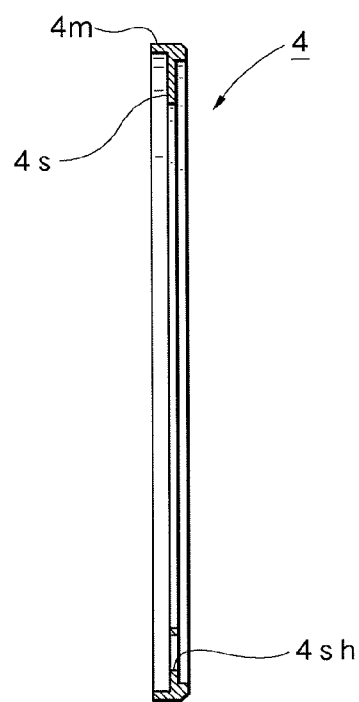
FIG. 10 is a cross sectional plan view of the lock releasing ring provided in the same lock releasing device.
Figure 11:
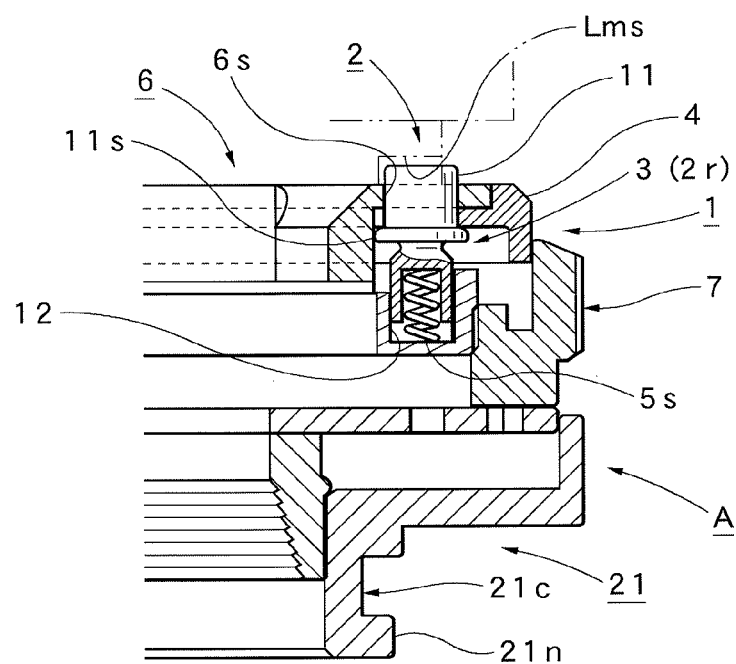
FIG. 11 is a partially enlarged cross sectional view showing the same lock releasing device and a locked state of a lens locking mechanism.

This mount adaptor A is used by being interposed between a camera body C and an interchangeable lens L in a case where the standard of a lens mount part Lm of the interchangeable lens L does not correspond with that of a camera mount part Cm in the camera body C. Thus, in using the mount adaptor A, as shown in FIG. 7 and FIG. 8, the rear side of the mount adaptor A is mounted on the camera mount part Cm of the camera body C, and the lens mount part Lm of the interchangeable lens L is mounted on the front side of the mount adaptor A to be used.

Figure 1:
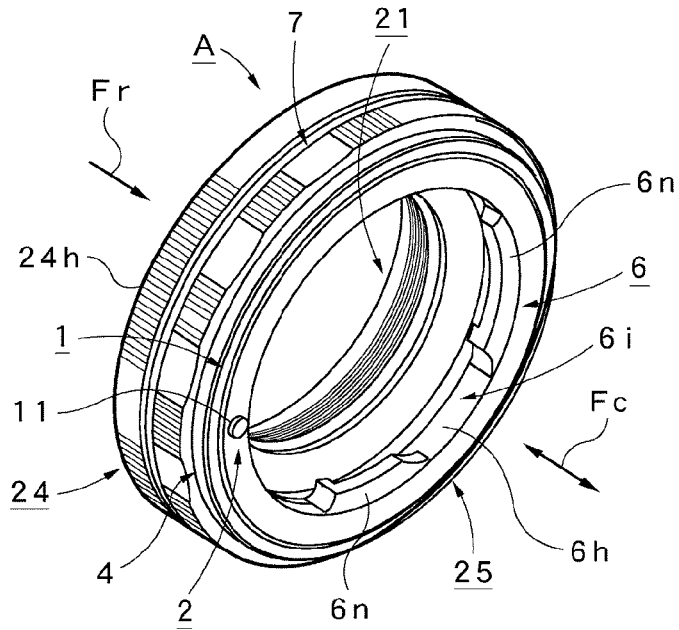
FIG. 1 is a perspective view of a mount adaptor provided with a lock releasing device relating to a preferred embodiment of the present invention.

FIG. 1 shows the mount adaptor A, and the mount adaptor A is entirely formed in a ring shape (short-tube shape). The mount adaptor A has a rear mount part 21 to and from which the camera mount part Cm of the camera body C is attached and detached on the rear end side of an optical axis direction Fc, and has a front mount part 6 to and from which the lens mount part Lm of the interchangeable lens L is attached and detached on the front end side of the optical axis direction Fc. To this front mount part 6, a lens locking mechanism 2 that locks the mounting in mounting the interchangeable lens L is attached, and the lock releasing device 1 relating to this embodiment for releasing the lock by this lens locking mechanism 2 is attached. Thus, depending on the type of the mount adaptor A, the rear mount part 21 is configured corresponding to the type of the camera body C, and the front mount part 6 is configured corresponding to the type of the interchangeable lens L.

Figure 2:
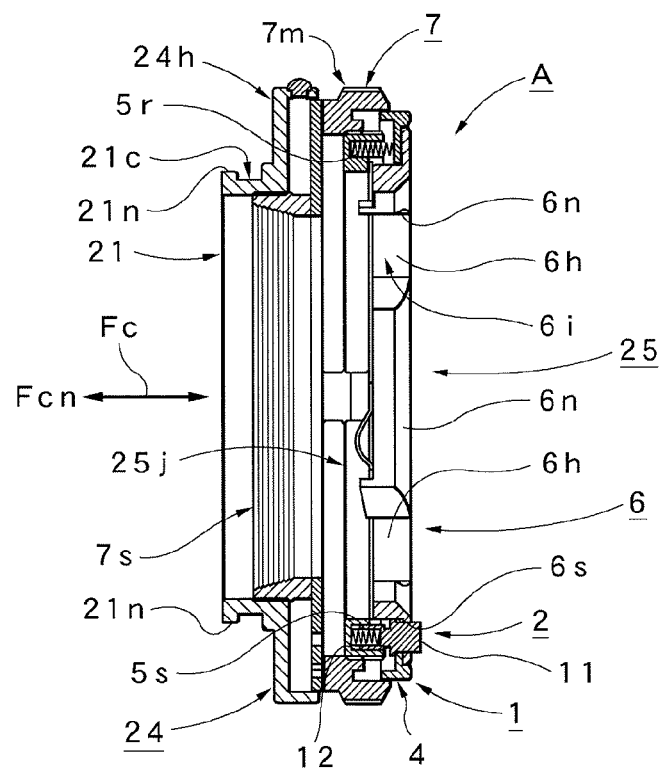
FIG. 2 is a cross sectional plan view of the same mount adaptor.

On the other hand, there is disposed an auxiliary ring 7 for focus adjustment in the middle of the mount adaptor A in the optical axis direction Fc. This auxiliary ring 7 is provided with an auxiliary ring body 7m that is located at the front part and a support tube part 7s that is located at the rear part, as shown in FIG. 2. The auxiliary ring body 7m is supported to be freely rotatable by this support tube part 7s. A rear mount block 24 having the rear mount part 21 is disposed at the back side of this auxiliary ring 7, and the front mount block 25 having the front mount part 6 is disposed at the front side of this auxiliary ring 7.

The rear mount block 24 forms the back side as the rear mount part 21, and forms the front side as a gripping barrel part 24h. The rear mount part 21 is provided with an engaging tube part 21c projecting backward and three locking claw parts 21n . . . disposed at the rear end of the engaging tube part 21c. Each of the locking claw parts 21n . . . is integrally formed at predetermined intervals in the circumferential direction at the rear end of the engaging tube part 21c, and is projected in a radial direction. At least a part of the respective locking claw parts 21n . . . are formed in different shapes, thereby being attached to and detached from the camera mount part Cm in the camera body C only at a specific angle position. In addition, as detailed illustrations are omitted, the camera mount part Cm has the same basic configuration and function as the front mount part 6 that is mentioned later, and has an inner peripheral surface allowing the insertion of the locking claw parts 21n . . . including the engaging tube parts 21c . . . at the rear mount part 21, three corresponding notched recess parts for inserting each of the locking claw parts 21n . . . , and locked claw parts that are formed between the notched recess parts. Moreover, the inner peripheral surface of the engaging tube part 21c at the rear mount part 21 is fixed to the outer peripheral surface of the support tube part 7s in the auxiliary ring 7 by screw coupling.

Figure 5:
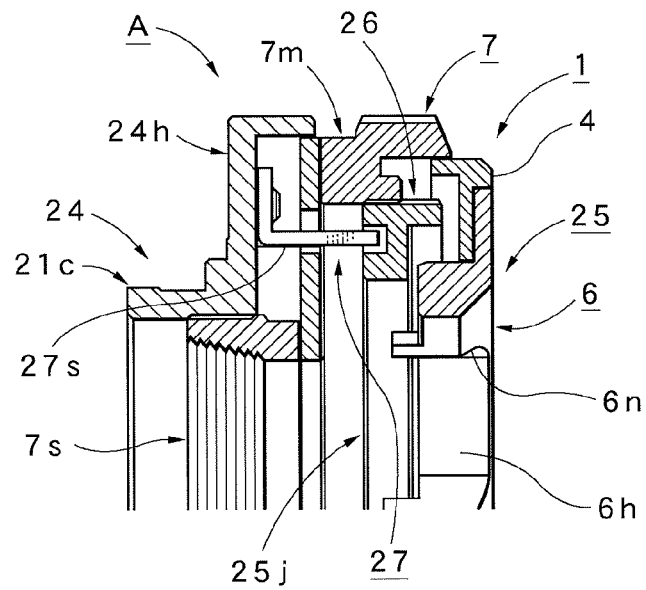
FIG. 5 is a partial enlarged cross sectional view for exhibiting a regulating mechanism of the same mount adaptor.

On the other hand, in the front mount block 25 that is disposed at the front side of the auxiliary ring 7, the front part side thereof is formed as the above-mentioned front mount part 6, and the rear part side thereof is formed as a screwing cylinder part 25j. In this case, the front mount part 6 and the screwing cylinder part 25j are integrally assembled, and the outer peripheral surface of the screwing cylinder part 25j is screwed to the inner peripheral surface of the auxiliary ring body 7m in the auxiliary ring 7 by a screwing mechanism 26 using a helicoid screw mechanism or the like (refer to FIG. 5). Moreover, in the front mount block 25 and the above-mentioned rear mount block 24, the relative displacement in the rotational direction is regulated by a regulating mechanism 27 using a regulating lever 27s, as shown in FIG. 5.

Figure 3:
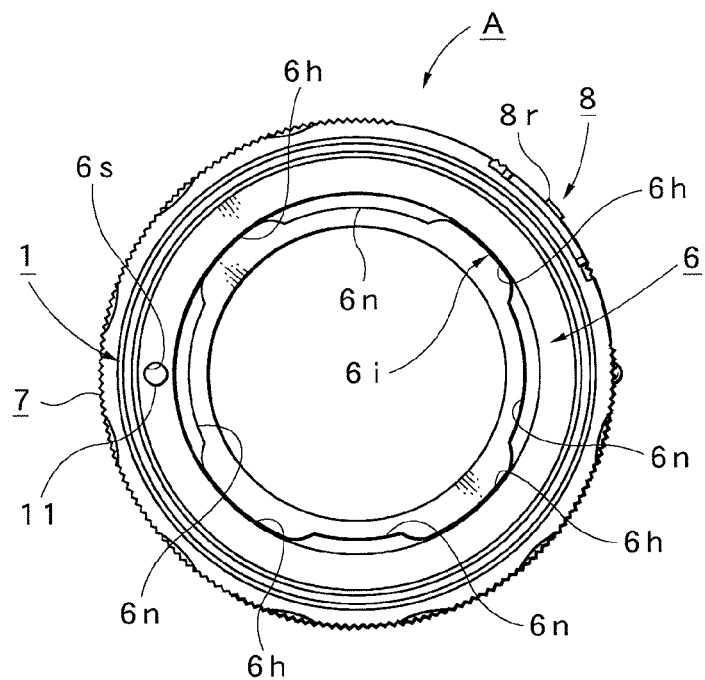
FIG. 3 is a front view of the same mount adaptor.
Figure 4:
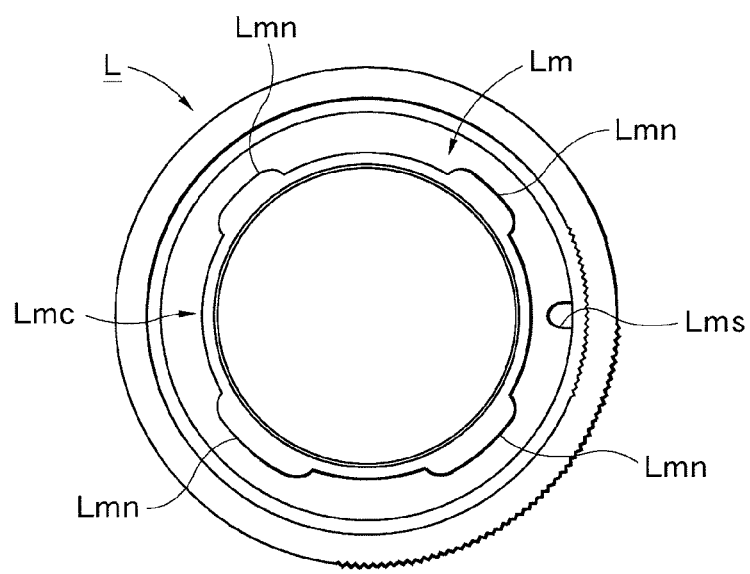
FIG. 4 is a rear view of an interchangeable lens that is attached to and detached from the same mount adaptor.

To this front mount part 6, the lens mount part Lm in the interchangeable lens L is attached and detached. FIG. 3 shows the front shape of the front mount part 6, and FIG. 4 shows the rear shape of the interchangeable lens L that is attached to and detached from this front mount part 6, i.e. the lens mount part Lm in the interchangeable lens L is respectively illustrated as one example in FIG. 3 and FIG. 4. The exemplified lens mount part Lm, as shown in FIG. 4 and FIG. 8, is provided with an engaging tube part Lmc projecting backward and four locking claw parts Lmn . . . at the rear end of this engaging tube part Lmc. Each of the locking claw parts Lmn . . . is integrally formed at predetermined intervals in the circumferential direction at the rear end of the engaging tube part Lmc, and is projected in a radial direction. At least a part of each of the locking claw parts Lmn . . . is formed in different shapes. Thereby, the front mount part 6 is attached to and detached from the lens mount part Lm in the interchangeable lens L only at the specific angle position.

Thus, the front mount part 6 in the mount adaptor A to and from which the lens mount part Lm in the interchangeable lens L is attached and detached comprises an inner peripheral surface part 6i allowing the insertion of the locking claw parts Lmn . . . including the engaging tube part Lmc and four locked claw parts 6n . . . at the front edge of this inner peripheral surface part 6i. Each of the locked claw parts 6n . . . is integrally formed at predetermined intervals in the circumferential direction at the front edge of the inner peripheral surface part 6i, and projected in the central direction. Moreover, notched recess parts 6h . . . allowing the entry of each of the locking claw parts Lmn . . . are formed in the space between each of the locked claw parts 6n . . . , and the shape of these notched recess parts 6h . . . each corresponds to the shape of each of the locking claw parts Lmn . . . .

In such a configuration, the auxiliary ring 7 and the front mount block 25 are screwed through the screwing mechanism 26, and only the rotational displacement of the front mount block 25 is regulated by the regulating mechanism 27. Thus, if the auxiliary ring 7 is manually turned to be operated, the interchangeable lens L can be relatively displaced to the camera body C in the optical axis direction Fc. Therefore, the interchangeable lens L can be moved in addition to the focusing range (distance) of the original focus ring provided in the interchangeable lens L, thereby the entire focusing range (distance) can be further expanded so as to further enhance the entire camera performance.

Figure 6:
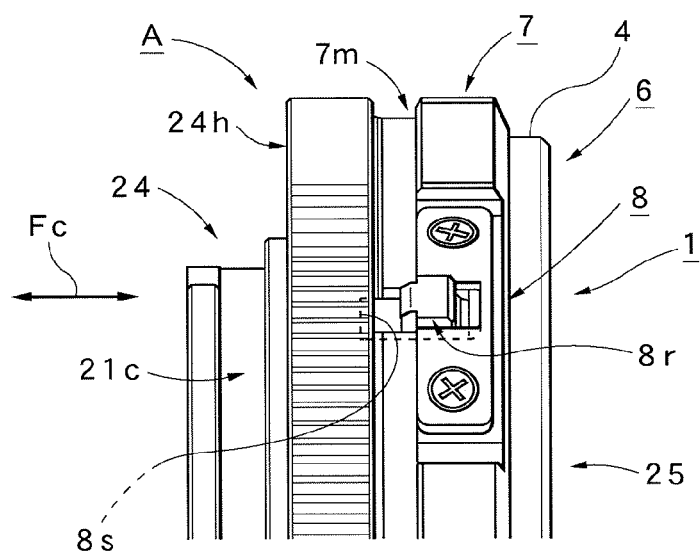
FIG. 6 is a partial enlarged side view for exhibiting an auxiliary ring locking mechanism of the same mount adaptor.

Moreover, the auxiliary ring 7, as shown in FIG. 6, is provided with an auxiliary ring locking mechanism 8 for locking or releasing the lock of the adjusted position (set position) of the auxiliary ring 7. This auxiliary ring locking mechanism 8 has a locking member 8r that is slidingly displaced to advance and retreat the optical axis direction Fc in the outer peripheral surface of the auxiliary ring 7, and this locking member 8r is biased to the rear mount block 24 side that is located at the back by the non-illustrated spring member. Further, in the rear mount block 24, one or two or more engaging recessed parts 8s . . . allowing the insertion of a part of the locking member 8r are formed at predetermined positions in the circumferential direction. Providing such an auxiliary ring locking mechanism 8 enables locking of the adjusted position, thereby such inconvenience that the set position that is adjusted by the auxiliary ring 7 is shifted by mistake during use can be avoided, so as to further enhance the stability in use and ease of use.

The lens locking mechanism 2 for locking the mounting in mounting the interchangeable lens L and the lock releasing device 1 relating to this embodiment for releasing the lock of this lens locking mechanism 2 by manual operation are disposed between the front mount part 6 and the screwing cylinder part 25*j* in the mount adaptor A.

Next, the concrete configuration of the lock releasing device 1 (including the lens locking mechanism 2) relating to this embodiment is explained by referring to FIG. 1 to FIG. 10.

The lock releasing device 1 is integrally formed with the lens locking mechanism 2. In this case, the lens locking mechanism 2 is provided with a round bar-shaped lock pin 11 shown in FIG. 2 and FIG. 9. This lock pin 11 has the rear part inserted in a guide recessed part 12 that is provided in the screwing cylinder part 25*j* through a spring (elastic member) 5*s*, and has the front end part projected forward through an opening part 6*s* that is provided in the front mount part 6. Thereby, the lock pin 11 is biased forward by the compressive elasticity of the spring 5*s*, and the forward displacement is regulated by a flange-shaped stopper part 11*s* that is provided integrally in the lock pin 11.

In this case, the position in which the lock pin 11 is disposed is arranged at the position on the right side seen from the back direction Fr to the mounted interchangeable lens L. Thereby, operation can be easily done by the finger H (refer to FIG. 12) of a right hand in holding the camera body C with a right hand, so as to contribute to an improvement in the easiness and rapidity of the releasing operation. In addition, the case of arranging at the position on the left side is not eliminated. In this case, operation can be performed by a finger of the left hand in holding the camera body C with the left hand.

On the other hand, the lens mount part Lm is provided with a U-shaped notched engagement part Lms allowing the insertion of the tip part of the lock pin 11, as shown in FIG. 4. Thus, the tip part of the lock pin 11 is engaged to the notched engagement part Lms in mounting, and the mounted interchangeable lens L is locked. In this case, the lock pin 11 is displaced to the biasing direction (forward) by elasticity of a spring 5*s*, so as to function as a lock part 2*r*. Moreover, if the lock pin 11 is displaced to the opposite direction (backward) to this biasing direction, the lock can be released.

Next, the configuration of the lock releasing device 1 that becomes the configuration of a main part is explained. The lock releasing device 1 is provided with the lock releasing ring 4 shown in FIG. 9 and FIG. 10. The lock releasing ring 4 is provided with a releasing ring body part 4*m* that is formed in a cylindrical form and a ring plate-shaped regulating ring part 4*s* that is integrally formed at the intermediate position in the optical axis direction Fc in the inner peripheral surface of this releasing ring body part 4*m* and extended in the central direction. The lock releasing ring 4 is interposed between the front mount part 6 and the screwing cylinder part 25*j* as shown in FIG. 2, and is assembled in such a manner as to be freely displaced over the predetermined range in the forward and backward directions. At this time, consideration is made in such a manner that the outer peripheral surface of the ring body part 4*m* is guided to the inner peripheral surface of the auxiliary ring body 7*m*. Moreover, consideration is made in such a manner that the front of the regulating ring part 4*s* is regulated by the lens mount part Lm. A plurality of compressed springs (elastic members) 5*r* . . . are interposed between the front of the screwing cylinder part 25*j* and the back face of the regulating ring part 4*s*. In the case of exemplification, four springs 5*s*, 5*r* . . . in total, i.e. three springs 5*r* . . . and one of the above-mentioned springs 5*s* are arranged at equal intervals along the circumferential direction.

Thereby, the lock releasing ring 4 is biased forward by the compressive elasticity of the springs 5*s*, 5*r* . . . , and is regulated by the front mount part 6. Consequently, the lock releasing ring 4 can be externally pressed to be operated. In this case, the tip side of the lock releasing ring 4 is projected from the front end of the auxiliary ring 7 over a predetermined width, and the tip surface of the lock releasing ring 4 is made to correspond to the surface of the tip surface of the front mount part 6. That is, consideration is made in such a manner that a sense of integration (a sense of unity) on the design is created to the interchangeable lens L and the mount adaptor A.

Moreover, the regulating ring part 4*s* is provided with an opening part 4*sh*, through which the tip part side of the above-mentioned lock pin 11 is inserted. Thereby, the tip part is projected forward through the opening part 6*s* of the front mount part 6 after passing through the opening part 4*sh*. Thus, the lock pin 11 functions as the lock part 2*r*, and is concurrently used with the lock releasing part 3, to which the displacement of the lock releasing ring 4 in the optical axis Fc direction is transmitted. Thus, if the lock releasing part 3 is concurrently used with the lock part 2*r*, the simplification of the configuration is achieved, so as to provide advantages of contributing to a reduction in costs due to a reduction in the number of components, an improvement in durability due to an improvement in rigidity, and an improvement in a sense of operation.

Furthermore, in this embodiment, the case in which the lock releasing device 1 (lock releasing ring 4) is attached to the mount adaptor A is shown. Thus, if the lock releasing ring 4 is provided in the mount adaptor A, greater performance can be obtained from the point of securing the action effects of this invention. That is, since the entire shape of the mount adaptor A is a ring shape, the operation lever had to be provided instead of the operation button in conventional cases. Thus, the projecting part was more prominent to be an obstructive existence as the entire shape, but these conventional problems could be solved by the adoption of the lock releasing ring 4.

Next, the function of the lock releasing device 1 relating to this embodiment including the use method of the mount adaptor A is explained by referring to FIG. 1 to FIG. 13.

First, in using the mount adaptor A, the rear mount part 21 of the mount adaptor A is mounted on the camera body C. In this case, the gripping barrel part 24*h* of the mount adaptor A is held by a hand, and the rear mount part 21 of the mount adaptor A is inserted to the camera mount part Cm in the camera body C at a specific angle position. After that, turning it in the predetermined direction to be operated causes each of the locking claw parts 21*n* . . . and the locked claw part of the camera mount part Cm to be engaged, so as to lock the mounting by the lens locking mechanism in the camera body C whose illustration is omitted.

Figure 13:
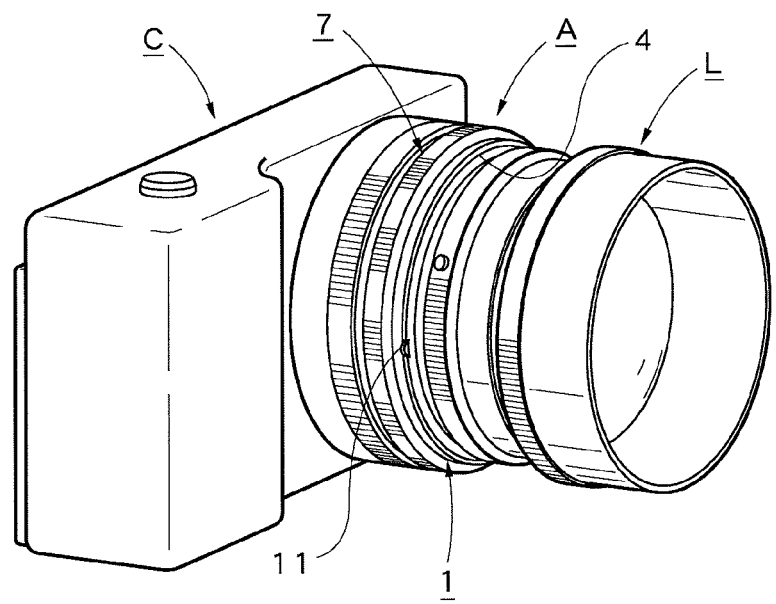
FIG. 13 is an entire perspective view showing the state in which the camera body and the interchangeable lens are mounted on the same mount adaptor.

Next, the interchangeable lens L is mounted on the front mount part 6 of the mount adaptor A. In this case, the lens mount part Lm of the interchangeable lens L is also inserted to the front mount part 6 of the mount adaptor A at a specific angle position. At this time, the lock pin 11 that is elastically supported by the springs 5*s* (5*r* . . . ) is pushed into the front of the front mount part 6. After this, if the interchangeable lens L is turned to the predetermined direction to the mount adaptor A to be operated, each of the locking claw parts Lmn . . . of the camera mount part Cm and the locked claw parts 6*n* . . . of the front mount part 6 are each engaged. If the position of the lock pin 11 that is pushed into the front of the front mount part 6 corresponds to the position of the notched engagement part Lms, the lock pin 11 is projected forward by elasticity of the spring 5s, and enters the notched engagement part Lms. Thereby, the mounting of the interchangeable lens L is locked by the locking function of the lens locking mechanism 2. The lens locking mechanism 2 in a locking state is shown in an enlarged cross section in FIG. 11. Moreover, the entire appearance configuration in which the camera body C, the mount adaptor A, and the interchangeable lens L are mounted is shown in FIG. 13. From the above, mounting of the mount adaptor A and the interchangeable lens L to the camera body C is completed.

Figure 12:
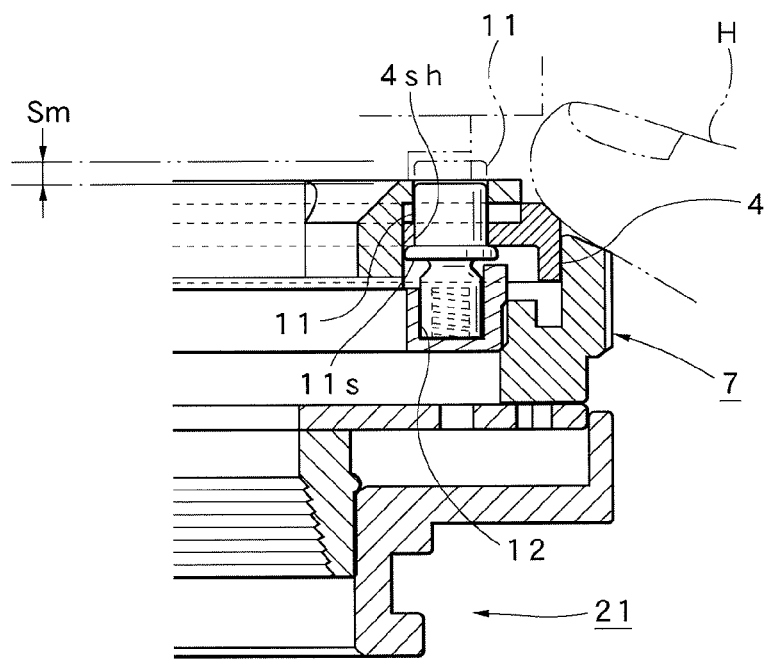
FIG. 12 is a partially enlarged cross sectional view of the same lock releasing device and a time of releasing the lock of the lens locking mechanism.

On the other hand, in the case where the interchangeable lens L is removed from the mount adaptor A, operation is as follows. First, the camera body C is held by a hand, and the lock releasing ring 4 is pushed into the auxiliary ring 7 side that is located at the back to be operated by a finger H of the hand as shown in FIG. 12. At this time, in the operation range to the lock releasing ring 4, the predetermined range to the lock releasing part 3 (lock pin 11) can be operated. Concretely, in the case of assuming a general interchangeable lens L, the circumferential direction range at approximately ±50 [°] to the position of the lock releasing part 3 and the circumferential direction range of approximately 100[°] on the whole can be operated. In this way, since the lock releasing device 1 relating to this embodiment is provided with the lock releasing ring 4 that can transmit at least a predetermined displacement amount Sm to the lock releasing part 3 and can be externally operated, the part at least over a predetermined range in the lock releasing ring 4 that transmits the displacement amount Sm to the lock releasing part 3 becomes an operable range. Thus, easy and rapid releasing operation is permitted, so as to contribute to an improvement in operability. Moreover, since the lock releasing ring 4 is arranged in such a manner that it can be displaced to advance and retreat in the optical axis direction Fc including the lock releasing direction Fcn for releasing the lock against elasticity of the elastic members 5s (5r . . . ) biasing in the optical axis direction Fc, the lock releasing operation can be easily performed by so-called a one-push method.

On the other hand, since a stopper part 11s is engaged to the auxiliary ring 7, the operation of pushing in the lock releasing ring 4 transmits a predetermined displacement amount based on the operation to the stopper pin 11 (lock releasing part 3), so as to cause the stopper pin 11 to be pushed in together. If the lock releasing part 3 is displaced by a predetermined displacement amount Sm based on the operation amount of the auxiliary ring 7, the tip surface of the stopper pin 11 comes off from the notched engagement part Lms of the lens mount part Lm. Then, the interchangeable lens L may be turned by the other hand in the opposite direction to the direction at the mounting time. At this time, if the interchangeable lens L is turned to the specific angle position, the lens mount part Lm of the interchangeable lens L can be separated from the front mount part 6 of the mount adaptor A.

Further, the operation in removing the mount adaptor A from the camera body C can be performed likewise. In this case, the camera body C side is provided with a predetermined lock releasing mechanism whose illustration is omitted, so that the lock can be released upon operating by the procedure. If the lock is released, the mount adaptor A is manually turned in relation to the camera body C. If it is turned to the specific angle position, the front mount part 6 of the mount adaptor A can be separated from the camera mount part Cm of the camera body C.

Consequently, according to the lock releasing device 1 relating to this above-mentioned embodiment, the lock releasing ring 4 that is arranged at the coaxial position to the interchangeable lens L and has a ring shape on the whole is provided so that this lock releasing ring 4 can be integrated in shape (in design) with the interchangeable lens L. Therefore, the useless projecting part at the front of the camera is eliminated, so as to improve space-saving properties, handling properties, freedom of design, and further improve product marketability due to creating an entire sense of unity.

Figure 14:
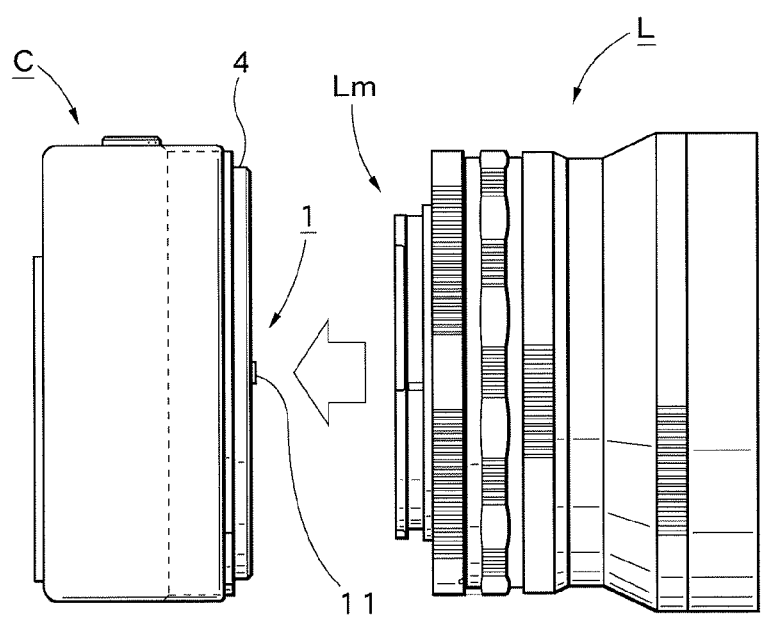
FIG. 14 is a side view of the camera body and the interchangeable lens provided with the lock releasing device relating to a modified embodiment of the present invention.
Figure 15:
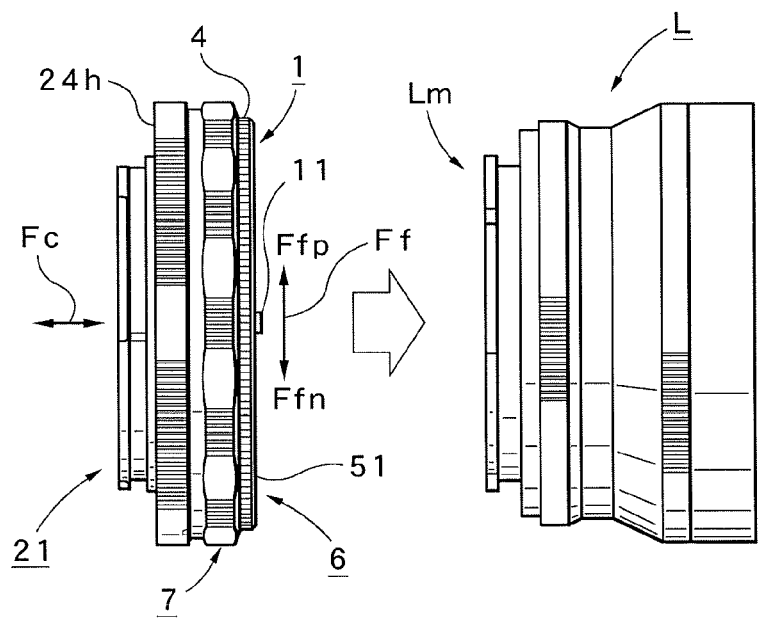
FIG. 15 is a side view of the mount adaptor and the interchangeable lens provided with the lock releasing device relating to another modified embodiment of this invention.
Figure 16:
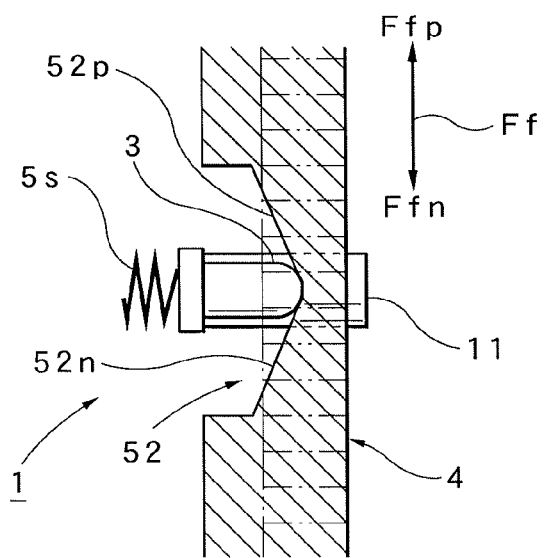
FIG. 16 is a fundamental block diagram of the lock releasing device in the same mount adaptor.

Next, the lock releasing device 1 relating to the modified embodiment of this invention is explained by referring to FIG. 14 to FIG. 16.

In the lock releasing device 1 relating to the modified embodiment shown in FIG. 14, the lock releasing ring 4 is arranged in the camera body C. The embodiment in FIG. 1 to FIG. 13 shows the case in which the lock releasing ring 4 is arranged in the mount adaptor A that is attached to and detached from the camera mount part Cm in the camera body C, but FIG. 14 shows the arrangement of integration with the camera body C. Thus, the camera body C is provided with the lens locking mechanism 2 including a part on the front side of the afore-mentioned mount adaptor A, i.e. the front mount part 12 and the lock releasing device 1, and is not provided with the auxiliary ring 7 and the rear mount part 21 in the mount adaptor A (do not exist). Thus, if the lock releasing ring 4 is integrally arranged with the camera body C, the useless projecting part at the front (front panel) of the camera body C can be eliminated, so as to contribute to an improvement in the design properties (shape properties) of the entire camera.

In the lock releasing device 1 relating to the changed embodiment shown in FIG. 15 and FIG. 16, the lock releasing ring 4 is arranged so that it can be displaced to rotate in the circumferential direction Ff including the lock releasing directions Ffn and Ffp in which the lock is released against elasticity of the elastic member 5s biasing in the circumferential direction Ff. Thus, although the lock releasing ring 4 is arranged in such a manner that it can be displaced to rotate in the circumferential direction Ff, it is arranged with restrictions in the displacement in the optical axis direction Fc. In addition, the outer peripheral surface of the lock releasing ring 4 is provided with an anti-slipping part 51 by projections and recesses. On the other hand, in the case of exemplification, the lock releasing part 3 is integrally formed with the lock part 2r (lock pin 11), but the case in which it is formed in a separate body without being concurrently used is shown. Accordingly, the lock releasing part 3 may be formed in a separate body from the lock part 2r in the lens locking mechanism 2. In this case, the assembly of the lock releasing device 1 including the lock releasing part 3 is allowed without being influenced by the shape and configuration of the lock part 2r. Thus, an improvement in the freedom of design of the entire device can be contrived, so as to achieve an improvement in multifunctional properties.

Moreover, in the exemplified lock releasing ring 4, as shown in FIG. 16, a lock releasing surface 52 in which inclined surfaces 52p and 52n are combined in a V-shape is formed, and the tip of the lock releasing part 3 that is supported by the elastic member 5s is abutted on this lock releasing surface 52. In this case, the elastic member 5s can be engaged with both of the inclined surfaces 52p and 52n, so that the elastic component force by the elastic member 5s acts on both one direction Ffp and the other direction Ffn in the circumferential direction Ff. Thus, even if the lock releasing ring 4 is displaced in either direction Ffp or Ffn, it can be returned to the locking position (boundary position between the inclined surfaces 52p and 52n). In addition, the configuration shown in FIG. 16 is a fundamental configuration. If it exhibits the same kind of function (action), it can be substituted with various configurations.

Thus, if the lock releasing ring 4 is arranged in such a manner that it can be displaced to rotate in the circumferential direction Ff including the lock releasing directions Ffn and Ffp in which the lock is released against elasticity of the elastic member 5s that bias in the circumferential direction Ff, the lock releasing operation can be performed similarly to the operation ring such as the focus ring and the zoom ring in the interchangeable lens L so as to create a sense of unity to the interchangeable lens L from the operation side. Moreover, since operation can be performed at all the positions in the entire periphery (360[°] in the circumferential direction Ff of the lock releasing ring 4, the ease of use and convenience can be enhanced. Also, there is an advantage that it can be easily operated by a lefthand user.

As stated above, the preferred embodiment (modified embodiment) is explained in details, but this invention is not limited to such embodiment, and can be optionally modified, added, and erased in a range not deviating from the gist of this invention in the detailed configuration, shape, material, number, etc.

For example, as the exemplification, the camera body side includes not only the camera body but the mount adaptor mounted to the camera body. Moreover, the camera body includes various camera bodies such as a still camera body, a video camera body, analog camera body, digital camera body, etc., and also includes various optical apparatus bodies using the same interchangeable lens as a projector body or the like. Thus, "camera body" in this invention is a concept including various "optical apparatus bodies" allowing the attachment and detachment of the interchangeable lens. Further, the case in which the mount adaptor A is provided with an auxiliary ring 7 is exemplified, but providing the auxiliary ring 7 is not necessarily required.

INDUSTRIAL APPLICABILITY

The lock releasing device relating to this invention can be used in releasing the lock of the lens locking mechanism for locking the interchangeable lens that is mounted on the camera body side.

REFERENCE SIGNS LIST

1: Lock releasing device, 2: Lens locking mechanism, 2r: Lock part, 3: Lock releasing part, 4: Lock releasing ring, 5 . . . : Elastic member, 6: Front mount part, 7: Auxiliary ring for focus adjustment, 8: Auxiliary ring locking mechanism, A: Mount adaptor, C: Camera body, Cm: Camera mount part, L: Interchangeable lens, Sm: Predetermined displacement amount, Fr: Back direction, Fc: Optical axis direction, Fr: Circumferential direction, Fcn: Lock releasing direction, Ffn: Lock releasing direction, Ffp: Lock releasing direction

CITATION LIST

Patent Literature 1
    Japanese Unexamined Patent Application Publication No. 2011-175190
Patent Literature 2
    Japanese Unexamined Patent Application Publication No. 2000-305127
Patent Literature 3
    Japanese Unexamined Patent Application Publication No. 10 (1998)-206953
Patent Literature 4
    Japanese Unexamined Patent Application Publication No. 10 (1998)-90773

The invention claimed is:

1. A lock releasing device to enable the mounting and dismounting of interchangeable lenses from a camera body which comprises:
    a camera body,
    an interchangeable lens containing a notched engagement part,
    a mount adapter mounted on the camera body, said mount adapter containing locking claws,
    the interchangeable lens containing locking claws adapted to engage the locking claws of the mount adapter by rotation of the interchangeable lens relative to the mount adapter,
    said mount adapter containing a lock releasing device which includes a lock releasing ring coaxially positioned relative to the lens and operatively engaged with an elastically biased lock pin which is adapted to engage and disengage the notched engagement part of the interchangeable lens,
    whereby, by externally engaging the lock releasing ring, the elastically biased lock pin is displaced in a predetermined amount enabling the easy engagement or disengagement of the lens from the camera.

2. The lock releasing device for the camera according to claim 1, wherein the lock releasing ring is engaged with the lock pin from a tip side of the lock pin to transmit the displacement of the lock releasing ring to the lock pin.

3. The lock releasing device for the camera according to claim 1, wherein at least a part of the lock pin is exposed to the outside.

4. The lock releasing device for the camera according to claim 1, wherein the lock pin is disposed at the position on the right side as seen from the back direction to the interchangeable lens that is mounted on the camera body.

5. The lock releasing device for a camera according to claim 1, wherein the lock releasing ring is disposed in such a manner that it can be displaced to advance and retreat in the optical axis direction including in the lock releasing direction, in which the lock is released against the elasticity of the elastically biased lock pin, in the optical axis direction.

6. The lock releasing device for camera according to claim 1, wherein the lock releasing ring is disposed in such a manner that it can be displaced to rotate in the circumferential direction including the lock releasing direction in which the lock is released against the elasticity of the elastically biased lock pin, in the circumferential direction.

7. The lock releasing device for camera according to claim 6, wherein the lock releasing ring has an inclined surface that converts the rotating displacement in the circumferential direction into the displacement in the optical axis direction to transmit to the lock pin.

8. The lock releasing device for camera according to claim 1, wherein the lock releasing ring is disposed in the mount adaptor which is attachable to and detachable from the the camera body.

9. The lock releasing device for camera according to claim 8, wherein the mount adaptor includes an auxiliary ring for focus adjustment, to and from which the interchangeable lens is attached and detached, in the optical axis direction.

10. The lock releasing device for camera according to claim 9, wherein the mount adaptor is provided with an auxiliary ring locking mechanism for locking or releasing the lock of the adjustment position of the auxiliary ring for focus adjustment.

11. The lock releasing device for camera according to claim 1, wherein the lock releasing ring is integrally arranged in the camera body.

\* \* \* \* \*